No. 638,563. Patented Dec. 5, 1899.
H. F. CUNTZ.
GEAR CUTTING MACHINE.
(Application filed Apr. 12, 1899.)
(No Model.) 5 Sheets—Sheet 1.

Witnesses:
Henrietta Lyon
A. N. Jesbera

Inventor:
Hermann F. Cuntz
by Redding, Kiddle & Greeley
Attys

THE NORRIS PETERS CO., PHOTO-LITHO., WASHINGTON, D. C.

No. 638,563. Patented Dec. 5, 1899.
H. F. CUNTZ.
GEAR CUTTING MACHINE.
(Application filed Apr. 12, 1899.)
(No Model.) 5 Sheets—Sheet 2.
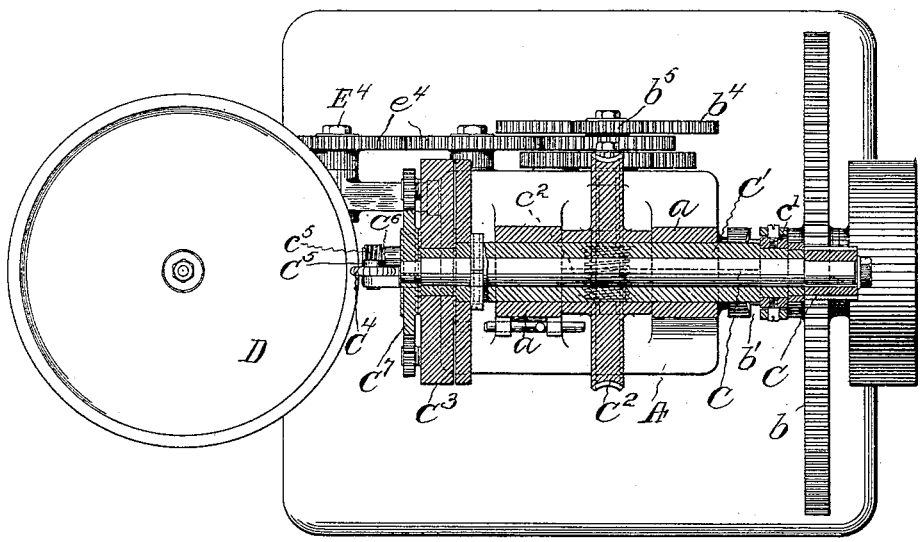
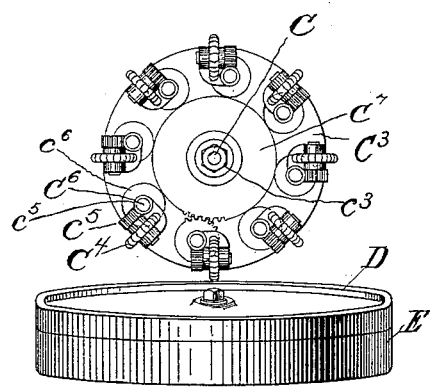
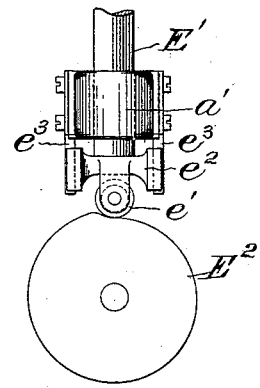
Witnesses: Inventor:

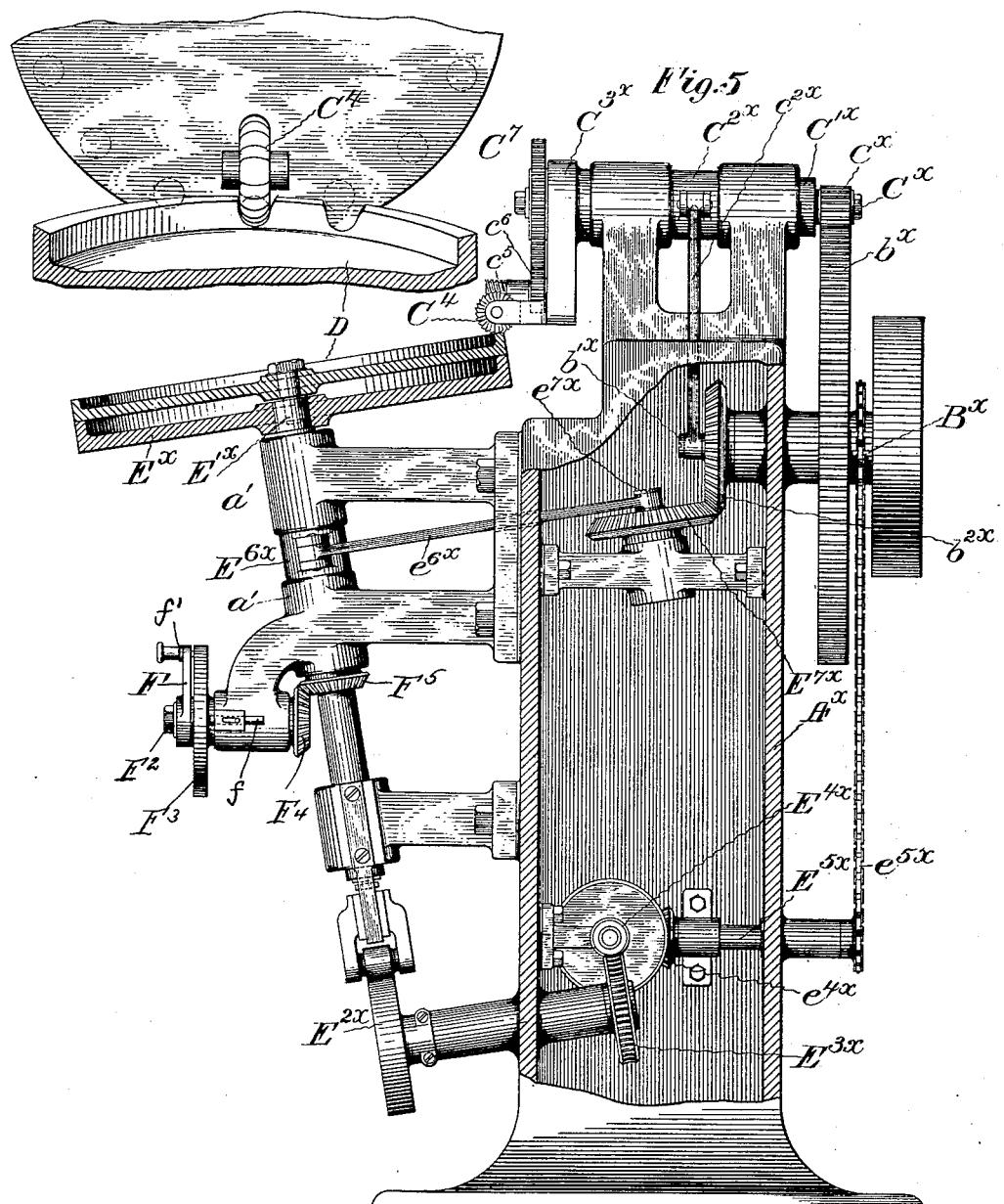

No. 638,563. Patented Dec. 5, 1899.
H. F. CUNTZ.
GEAR CUTTING MACHINE.
(Application filed Apr. 12, 1899.)
(No Model.) 5 Sheets—Sheet 4.

Witnesses
Henrietta Lyon.
A. N. Jesbera

Inventor:
Hermann F. Cuntz
by Redding, Kiddle & Greeley
Attys

THE NORRIS PETERS CO., PHOTO-LITHO., WASHINGTON, D. C.

No. 638,563. Patented Dec. 5, 1899.
H. F. CUNTZ.
GEAR CUTTING MACHINE.
(Application filed Apr. 12, 1899.)

(No Model.) 5 Sheets—Sheet 5.

Witnesses
Louis R. Moore
Andrew H. Scoble

Inventor.
Hermann F. Cuntz
by Redding, Kiddle & Greeley
Attys

THE NORRIS PETERS CO., PHOTO-LITHO., WASHINGTON, D. C.

UNITED STATES PATENT OFFICE.

HERMANN F. CUNTZ, OF HARTFORD, CONNECTICUT, ASSIGNOR TO THE AMERICAN BICYCLE COMPANY, OF JERSEY CITY, NEW JERSEY.

GEAR-CUTTING MACHINE.

SPECIFICATION forming part of Letters Patent No. 638,563, dated December 5, 1899.

Application filed April 12, 1899. Serial No. 712,693. (No model.)

*To all whom it may concern:*

Be it known that I, HERMANN F. CUNTZ, a citizen of the United States, and a resident of Hartford, in the county of Hartford and State of Connecticut, have invented certain new and useful Improvements in Gear-Cutting Machines, of which the following is a full, clear, and exact description, whereby any one skilled in the art can make and use the same.

My invention relates to the class of gear-cutting machines in which the cutter moves during the operation of cutting; and the object of my invention is to provide a machine of this class in which the cutter shall correspond with the engaging portion of the tooth of a gear adapted to mesh with the gear being cut and which said cutter shall have a movement during the cutting operation similar to that of the tooth of a gear adapted to mesh with the gear being formed in the machine.

Figure 1:
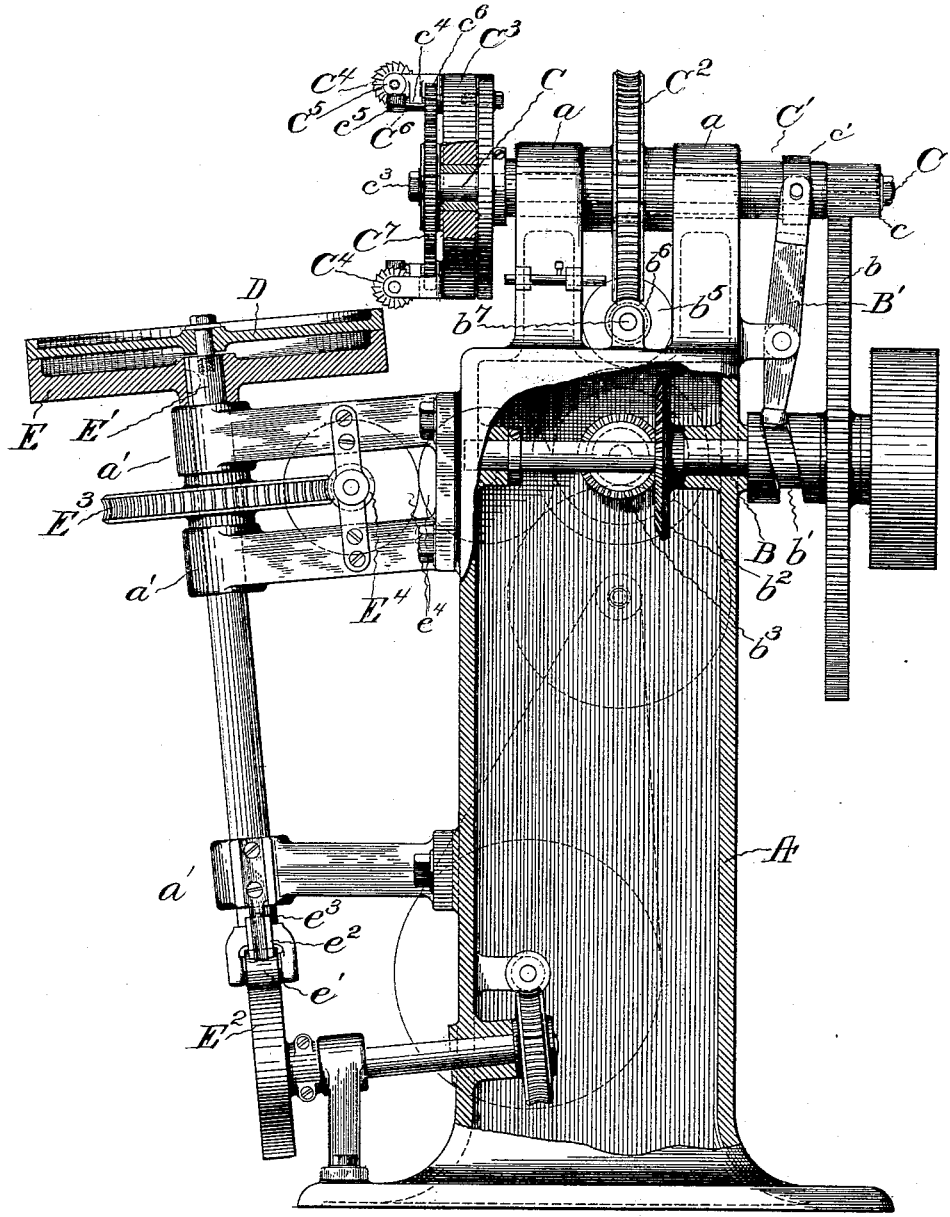
Figure 7:
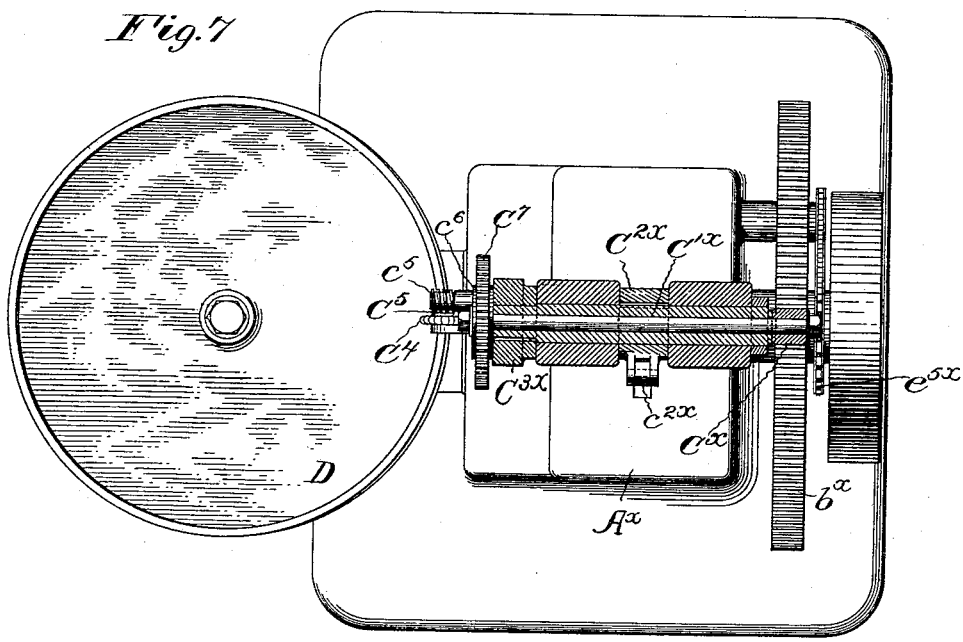
Figure 8:
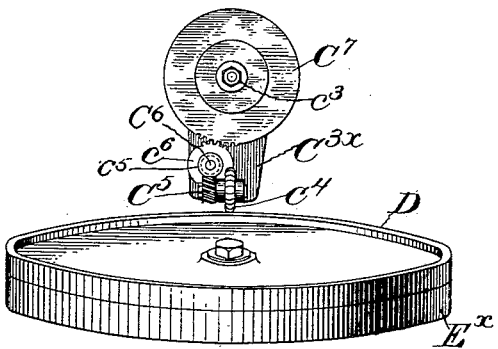
Figure 9:
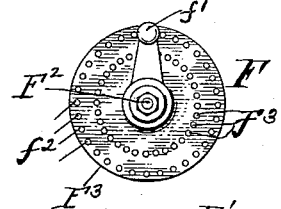
Figure 10:
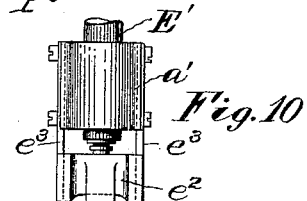
Figure 11:
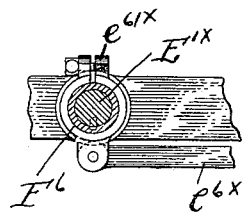
Figure 12:
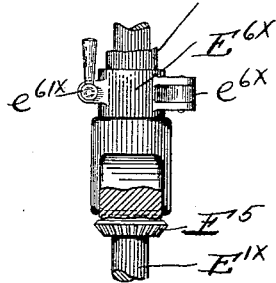
Figure 13:
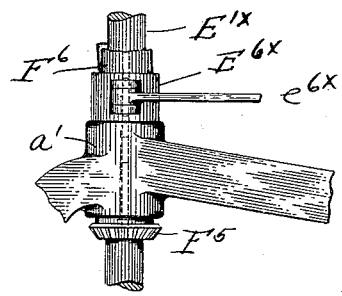

Referring to the drawings, Figure 1 is a view in side elevation of a machine embodying my invention with parts cut away to show construction. Fig. 2 is a top view of the machine with parts cut in horizontal section in the plane of the cutter-carrying shaft. Fig. 3 is a detail front view showing the relative position of the cutters and the blank supported on the carrier. Fig. 4 is a detail view showing the work-lifting mechanism. Fig. 5 is a view in side elevation of a modified form of machine with parts cut in section to show construction, the machine shown in this view having a single cutter. Fig. 6 is a detail view showing the relative position of the cutter and blank in this latter form of machine. Fig. 7 is a top view, partly in horizontal section, of this latter form of machine. Fig. 8 is a detail front view showing the relative position of the cutter and blank in this form of machine. Fig. 9 is a detail front view of the indexing device, and Fig. 10 is a detail view showing the work-lifting mechanism of this last form of machine. Figs. 11, 12, and 13 are detail views, in horizontal section, front elevation, and side elevation, respectively, illustrating the connection between the indexing devices and the work-shaft shown in Fig. 5.

In the accompanying drawings the letter A denotes a standard, in the upper part of which is supported in suitable bearings a main driving-shaft B and above this shaft a cutter-carrier shaft C, to which rotary movement is imparted by means of a gear $b$ and pinion $c$, the latter having a wide face to permit longitudinal movement of the shaft C without disengagement of said gear and pinion. The shaft C is supported in a sleeve C', mounted in bearings $a\ a$, and carries a ring $c'$, loosely mounted against longitudinal movement thereon. This ring is connected to a lever B', pivoted to the frame, with its lower end engaging a cam-groove $b'$ in a cam secured to the shaft B. A worm-gear $C^2$ is splined to the sleeve C' and is located between the bearings $a\ a$, that prevent lateral movement of the gear.

A cutter-carrier $C^3$ is secured to the forward end of the sleeve C', and upon this carrier are mounted disk-like rotating milling-cutters $C^4$, which correspond in number and relative angular position on the carrier with the teeth or pins of a gear adapted to mesh with the gear being cut, the revolving movement of the cutters in the cutting operation also corresponding to the movement of the teeth of a gear adapted to mesh with said gear being cut. The edge of each cutter is shaped in cross-section to correspond with the engaging portion of the tooth or pin of the mating gear, and each cutter is mounted to rotate in a bearing-block secured to the face of the carrier $C^3$. In the construction shown the shaft of each cutter has a worm-gear $C^5$ secured thereto and which is engaged by a worm $c^5$ on a short shaft $C^6$. This shaft is mounted in bearings in a block $c^4$ and carries a pinion $c^6$, which meshes with a pinion $C^7$, secured to the shaft C and held in position by a nut $c^3$ on the end of the shaft. This construction of parts provides for the necessary rotation of the cutters for the purpose of cutting and at the same time for a revolution of the cutters about the axis of the shaft C for the purpose of bringing the cutters into proper position with regard to the blank being cut. This latter movement of a cutter resembles the movement of a tooth of a gear adapted to mesh with the gear being cut. This construction also provides for a reciprocating movement of the cutters with respect to the work.

A worm-gear $C^2$ is driven through a suitable train of driving-gears, which includes in the construction shown bevel-gears $b^2 b^3$, spur-gears $b^4 b^5$, and a worm $b^6$ on a shaft $b^7$.

The blank to be cut, whether flanged, as represented in the drawings, or not, is supported in proper position with reference to the cutting mechanism and has a peripheral speed proportioned to the speed of revolution of the cutters about the axis of the carrier and is capable of being raised and lowered to move it into and out of operative relation with the cutters. As shown in the drawings, the blank D is clamped to a support on a work-carrier E. The latter is secured to a shaft $E'$, supported, preferably, in a proper position in suitable bearings $a'$, the shaft having at its lower end a roller $e'$, which rests upon the surface of a cam $E^2$, which is driven at proper speed through suitable gearing, (indicated mainly in dotted outline in Fig. 1 of the drawings,) motion being imparted to the train from the main shaft B. The shaft $E'$ has a step-bearing upon the frame $e^2$, which carries the roller $e'$, the frame being held from rotation by guides $e^3$, which enter grooves in opposite sides of the frame $e^2$.

A worm-gear $E^3$ is located between two adjacent bearings $a'$ and is connected to the shaft $E'$ by a key and slot, so as to provide for the required rotation of the shaft $E'$ and at the same time permit it to have the required lengthwise movement. This worm-gear $E^3$ is driven by the worm-shaft $E^4$ and a suitable train of spur-gears $e^4$ and the bevel-gears $b^2 b^3$ from the main shaft B.

The shaft B is driven, as by means of a belt connected to a pulley on the outer end of the shaft, and in operation the parts are so timed that the blank D is gradually moved upward into the path of cutting movement of a cutter $C^4$ at the same time that said cutter is reciprocated across the edge of the blank and is slowly fed in its path of revolution about the axis of the cutter-carrier shaft. The rotary feed of the carrier being relatively slow, each reciprocation of the cutter causes the active cutting edge to generate substantially a part surface of a cylinder, and consequently cut away the material of the blank to leave a tooth which would engage with the pin of a gear with which it is intended. These several movements are consequently so related as to time and speed that the teeth cut in the edge of the blank will be so constructed as to properly engage with a pin on a gear which corresponds to and mates properly with the teeth of the gear when cut.

It is obvious that the details of construction and arrangement of the several parts may be varied from what is shown in Figs. 1 to 4 of the drawings, particularly with respect to the number and relative arrangement of the cutters and the means for supporting and actuating the same. One such modified form of my invention is shown in Figs. 5 to 10 of the drawings. This latter form of machine has a single cutter in place of a series of cutters, and the successive teeth are cut during the swinging or oscillating movement of this single cutter, which moves back and forth in a limited path instead of in a path of continuous revolution about the cutter-carrier shaft. The work in this modified form of machine has a swinging movement about its own axis during a single cutting movement of the cutter which corresponds and is timed with the movement of the cutter, and the blank is moved forward step by step by the indexing mechanism required in this form after the completion of each cut.

In all forms of these machines where space permits the reciprocating movement of the cutter-carrier may be reduced and in extreme cases entirely eliminated, as when the cutter-disk is extremely large in proportion to the thickness of the flange of the gear being cut.

Referring to Figs. 5 to 10, inclusive, of the drawings, the standard $A^\times$, as shown, supports the driving mechanism and operative parts, the main shaft $B^\times$ and the cutter-carrier shaft $C^\times$ having the same relative arrangement as in the form of machine hereinbefore described. The shaft $C^\times$ is driven by a gear $b^\times$, meshing with the pinion $c^\times$, and it is mounted in a sleeve $c'^\times$, which has secured to its forward end a cutter-carrying arm $c^{3\times}$. On the outer end of this arm the rotating milling-cutter $C^4$ is pivoted in a block or bracket projection and is driven through the medium of a worm-gear $C^5$, worm $c^5$, shaft $C^6$, pinion $c^6$, and gear $c^7$ on the end of the shaft $C^\times$. In order to prevent the loss of time which would result from giving to the sleeve which supports the cutter-arm a continuous rotary movement, means are provided for imparting to the sleeve and the milling-cutter on it an oscillatory movement through a limited arc. For this purpose a short sleeve $C^{2\times}$ is keyed upon the sleeve $C'^\times$ and is connected at one side by a link or pitman $c^{2\times}$ to a crank-pin $b'^\times$ on the face of a bevel-gear $b^{2\times}$, secured to the inner end of the shaft $B^\times$. The blank D is supported by substantially the same means as described in connection with the machine previously described, the work-carrier $E^\times$ being secured to the shaft $E'^\times$, arranged at an angle with the cutter-carrier shaft and supported in bearings $a'$ and at its lower end on the cam $E^{2\times}$, the rotary movement of which imparts a longitudinal movement to the shaft. The rotary movement of the cam is imparted by the worm-gear $E^{3\times}$, worm-shaft $E^{4\times}$, bevel-gears $e^{4\times}$, shaft $E^{5\times}$, and chain $e^{5\times}$, which connects sprocket-gears respectively fast to the shaft $E^{5\times}$ and the main driving-shaft $B^\times$. In order that the work-carrier $E^\times$ and cutter-carrier $C^{3\times}$ may have timely reciprocating movement, a hub $E^{6\times}$, located between bearings $a'$ and connected with the shaft $E'^\times$, as hereinafter described, is connected at one side by a link or pitman $e^{6\times}$ with a crank-pin $e^{7\times}$ on the face of a bevel-gear $E^{7\times}$ in mesh with the bevel-gear $b^{2\times}$. These bevel-gears are so proportioned that the peripheral speed of the blank and the cutter in its revolution shall be the same. In this form of machine I prefer to have the slow-feed motion effected by the cam in raising the blank to cause the depth at which the cutter shall engage the blank during the successive dependent oscillations of the carrier and blank to be gradually increased. In order to shift the work for a new cut, an ordinary indexing mechanism (indicated at F) may be connected with the work-shaft $E'^\times$, the hub $E^{6\times}$ being disconnected from the shaft in any suitable manner during the operation of the indexing mechanism. As shown in Figs. 5, 9, 11, 12, and 13, the indexing-arm F', having a pin $f'$, is secured to a shaft $F^2$, supported in a suitable bearing. An indexing-disk $F^3$ is mounted loosely on the shaft between the arm and the bearing and is provided with two series of holes $f^2$ and $f^3$, the holes $f^2$ being adapted for engagement by the pin $f'$ and the holes $f^3$ for engagement by a pin $f$, mounted on the bearing. A gear $F^4$ on the shaft $F^2$ engages a gear $F^5$ on a sleeve $F^6$, which is supported in the lower bearing $a'$ and is splined to the shaft $E'^\times$, so that the latter can move longitudinally through the sleeve, while rotating with it. The hub $E^{6\times}$ is split and is clamped upon the sleeve $F^6$ by a clamp $e^{61\times}$, so that the sleeve is oscillated with the hub or released therefrom, as circumstances may require. In the operation of indexing, the machine having been stopped, the disk $F^3$ is first set by means of pin $f$, the clamp $e^{61\times}$ is opened to release the sleeve $F^6$, and the indexing-arm F' is moved from one hole $f^2$ to the next, thereby through the gears $F^4$ $F^5$ rotating the sleeve, work-shaft, work-carrier, and gear-blank the required distance for the foundation of a new tooth. The hub $E^{6\times}$ is then clamped again, the disk $F^3$ released by withdrawing the pin $f$, and the machine set in motion. The mode of operation of this form of machine will be readily understood from the foregoing description of its construction without further explanation herein, the relation of the single cutter to the gear-blank being clearly shown in Fig. 6, in which is also indicated the coincidence of the edge of the cutter with the engaging surface of the pin of the mating gear and the relation of the several pins of the mating gear to the gear being cut.

Various other modifications of construction and arrangement will readily suggest themselves in view of what is disclosed herein, and it will be evident that the invention is not to be limited to the precise construction and arrangements shown herein.

I claim as my invention—

1. A gear-cutting machine comprising a plurality of disk-like, rotating milling-cutters, a carrier upon which the cutters are mounted to move in the arc of a circle, mechanism for rotating said cutters upon their own axes and means for imparting to them parallel rectilinear reciprocation, and mechanism for rotating said carrier about an axis intersecting the axis of a work-carrier, the work-carrier, and means for giving to said work-carrier a movement corresponding with the movement of the cutter-carrier, substantially as shown and described.

2. In a gear-cutting machine, the combination of a shaft, a gear on said shaft, a carrier mounted concentrically with said shaft, a disk-like milling-cutter mounted in bearings on said carrier with its axis transverse to the axis of the carrier, gearing for rotating said cutter from the gear on the shaft, means for rotating said shaft, and means for imparting a rotary movement to said carrier, substantially as shown and described.

3. In a gear-cutting machine, the combination of a shaft, a gear on said shaft, a carrier mounted concentrically with said shaft, a disk-like milling-cutter with an edge corresponding to a section of the operative surface of a tooth of a gear which will mesh with the gear to be cut, said cutter being mounted in bearings on said carrier and with its axis transverse to the axis of the carrier, gearing for rotating said cutter from the gear on the shaft, means for rotating said shaft, and means for imparting a rotary movement to said carrier, substantially as shown and described.

4. In a gear-cutting machine, the combination of a shaft, a carrier mounted concentrically with said shaft, a cutter mounted upon said carrier, gearing between said shaft and cutter to rotate the latter, means to rotate said shaft, means to impart rotary movement to said carrier, and means for imparting a rectilinear reciprocation to said shaft and carrier together in the direction of their axis and at a greater speed than that of the revolution of said cutter about the axis of the carrier.

5. In a gear-cutting machine, the combination of a shaft, a sleeve upon said shaft, a carrier mounted upon said sleeve, a cutter mounted upon said carrier, gearing between said shaft and cutter to rotate the latter, a driving-gear for said sleeve having a key-and-slot engagement therewith, means for rotating said shaft, and means for imparting a to-and-fro movement to said shaft and sleeve in the direction of their axis, substantially as shown and described.

6. In a gear-cutting machine, the combination of a shaft, a sleeve upon said shaft, a carrier secured to said sleeve, a cutter mounted upon said carrier, gearing between said shaft and cutter to rotate the latter, a cam and a cam-lever engaging said sleeve and shaft to move the same longitudinally, means for rotating said sleeve, and independent means for rotating said shaft, substantially as shown and described.

7. In a gear-cutting machine, the combination of a rotating cutter, a carrier upon which said cutter is mounted to move bodily in the arc of a circle about the axis of the carrier, a work-carrier, means for giving to said work-carrier a rotary movement corresponding with the movement of the cutter-carrier, and means for moving said work-carrier in the direction of its axis to bring the work into operative relation with the cutter, substantially as shown and described.

8. In a gear-cutting machine, the combination of a rotating cutter, a carrier upon which said cutter is mounted to move bodily in the arc of a circle about the axis of the carrier, a work-carrier, a shaft to which said work-carrier is secured, a cam in operative engagement with said shaft to impart movement in the direction of its axis, and means for giving to the work-carrier a rotary movement corresponding with the movement of the cutter-carrier, substantially as shown and described.

9. In a gear-cutting machine, the combination of a rotating cutter, a carrier upon which said cutter is mounted to move bodily in the arc of a circle about the axis of the carrier, a work-carrier, a longitudinally-movable shaft to which said carrier is secured, means for giving to the work-carrier a rotary movement corresponding with the movement of the cutter-carrier, and a cam in operative engagement with said shaft to move the same longitudinally and arranged to retain a blank in position to receive a number of operations of a cutter, substantially as shown and described.

HERMANN F. CUNTZ.

Witnesses:
FELTON PARKER,
MAUD L. CLARK.